(12) United States Patent
Hulse

(10) Patent No.: US 7,264,367 B2
(45) Date of Patent: *Sep. 4, 2007

(54) ILLUMINATION DEVICE FOR SIMULATING NEON OR SIMILAR LIGHTING IN VARIOUS COLORS

(75) Inventor: George R. Hulse, Arlington Heights, IL (US)

(73) Assignee: iLight Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/383,307

(22) Filed: May 15, 2006

(65) Prior Publication Data

US 2006/0198119 A1    Sep. 7, 2006

Related U.S. Application Data

(63) Continuation-in-part of application No. 11/025,019, filed on Dec. 29, 2004, and a continuation-in-part of application No. 10/455,639, filed on Jun. 5, 2003, now Pat. No. 7,011,421, which is a continuation-in-part of application No. 09/982,705, filed on Oct. 18, 2001, now Pat. No. 6,592,238.

(60) Provisional application No. 60/533,581, filed on Dec. 31, 2003.

(51) Int. Cl.
    *F21V 9/16*    (2006.01)
(52) U.S. Cl. .................. 362/84; 362/231; 362/249
(58) Field of Classification Search ............ 362/84,
    362/231, 240, 242, 243, 246, 249, 251, 295,
    362/394, 555, 558, 610, 612, 800, 27, 26
    See application file for complete search history.

(56) References Cited

U.S. PATENT DOCUMENTS 5,810,463 A    9/1998    Kawahara et al.

(Continued)

FOREIGN PATENT DOCUMENTS

| CA | 2 282 819 | 3/2001 |
|----|-----------|--------|
| EP | 0982924   | 3/2000 |
| WO | 02/065016 | 8/2002 |
| WO | 02070948  | 9/2002 |

OTHER PUBLICATIONS

European Patent Office, Supplementary European Search Report, Feb. 20, 2007.
European Patent Office, Supplementary European Search Report, Oct. 2, 2006, pp. 1-3, Munich, Germany.

*Primary Examiner*—Y. My Quach-Lee
(74) *Attorney, Agent, or Firm*—Stites & Harbison, PLLC; David W. Nagle, Jr.; Jeffrey A. Haeberlin

(57) ABSTRACT

An illumination device has a light source, a waveguide, and a light-transmitting medium. The light source emits light of a first color. The waveguide has both optical waveguide and light scattering properties. The light-transmitting medium is composed of a matrix of substantially translucent material doped with a pigment, and is positioned between the light source and the waveguide such that a portion of the light emitted by the light source passes around the light-transmitting medium and reaches the waveguide directly, and a portion of the emitted light is received by the light-transmitting medium. The pigment changes a portion of the received light to a light of a second color. The waveguide receives and mixes the light of the first color and the light of the second color, and emits light of a combined color.

24 Claims, 7 Drawing Sheets

U.S. PATENT DOCUMENTS 6,350,041 B1 * 2/2002 Tarsa et al. .................. 362/231
6,361,186 B1    3/2002 Slayden
6,860,628 B2 * 3/2005 Robertson et al. .......... 362/800

2002/0043938 A1  4/2002 Lys
2003/0085642 A1  5/2003 Pelka et al.
2004/0076395 A1  4/2004 Poisel et al.

* cited by examiner

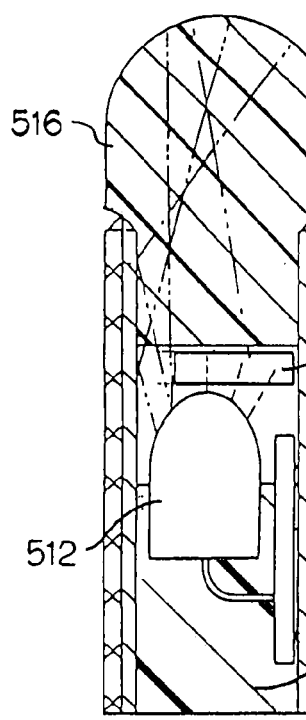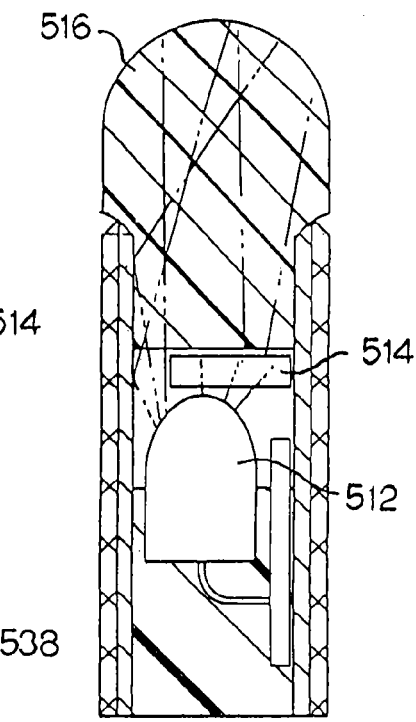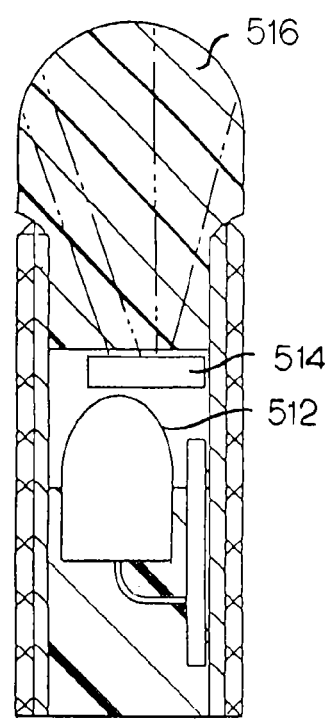
FIG.10a   FIG.10b   FIG.10c
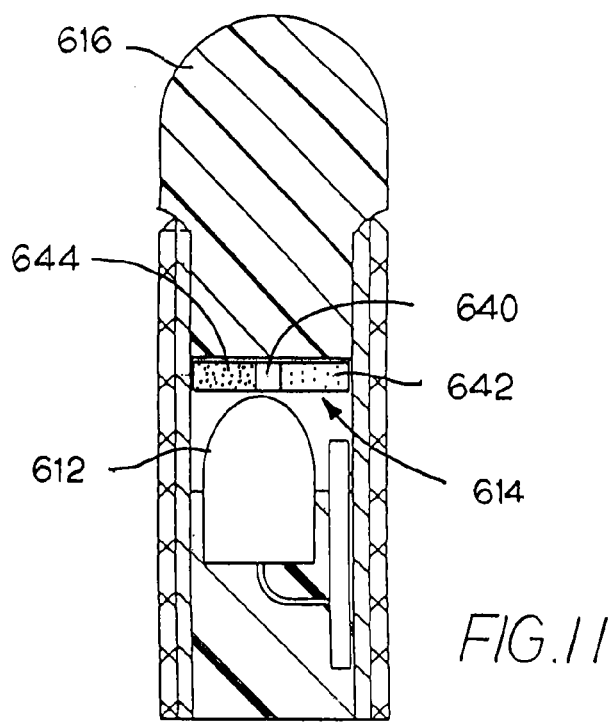
FIG.11

ILLUMINATION DEVICE FOR SIMULATING NEON OR SIMILAR LIGHTING IN VARIOUS COLORS

CROSS-REFERENCE TO RELATED APPLICATIONS

The present application is a continuation-in-part of U.S. patent application Ser. No. 11/025,019, filed Dec. 29, 2004; which claims priority to U.S. Provisional Application Ser. No. 60/533,581 filed Dec. 31, 2003 and is a continuation-in-part of U.S. patent application Ser. No. 10/455,639 filed on Jun. 5, 2003, now U.S. Pat. No. 7,011,421, issued on Mar. 4, 2006; which is a continuation-in-part of U.S. utility application Ser. No. 09/982,705, filed on Oct. 18, 2001, now U.S. Pat. No. 6,592,238, issued on Jul. 15, 2003, the entire disclosures of which are incorporated herein by reference.

BACKGROUND OF THE INVENTION

The present invention relates to an illumination device for simulating neon or similar lighting in various colors. The illumination device may also include a means for producing certain color-changing effects.

Neon lighting, which is produced by the electrical stimulation of the electrons in the low-pressure neon gas-filled glass tube, has been a main stay in advertising and for outlining channel letters and building structures for many years. A characteristic of neon lighting is that the tubing encompassing the gas has an even glow over its entire length irrespective of the viewing angle. This characteristic makes neon lighting adaptable for many advertising applications, including script writing and designs, because the glass tubing can be fabricated into curved and twisted configurations simulating script writing and intricate designs. The even glow of neon lighting being typically devoid of hot spots allows for advertising without visual and unsightly distractions. Thus, any illumination device that is developed to duplicate the effects of neon lighting must also have even light distribution over its length and about its circumference. Equally important, such lighting devices must have a brightness that is at least comparable to neon lighting. Further, since neon lighting is a well-established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

The recent introduction of lightweight and breakage resistant point light sources, as exemplified by high-intensity light-emitting diodes (LEDs), have shown great promise to those interested in illumination devices that may simulate neon lighting and have stimulated much effort in that direction. However, the twin attributes of neon lighting, uniformity and brightness, have proven to be difficult obstacles to overcome as such attempts to simulate neon lighting have largely been stymied by the tradeoffs between light distribution to promote the uniformity and brightness.

In an attempt to address some of the shortcomings of neon, commonly assigned U.S. Pat. No. 6,592,238, which has been incorporated in its entirety herein, describes an illumination device comprising a profiled rod of material having waveguide properties that preferentially scatters light entering one lateral surface ("light-receiving surface") so that the resulting light intensity pattern emitted by another lateral surface of the rod ("light-emitting surface") is elongated along the length of the rod. A light source extends along and is positioned adjacent the light-receiving surface and spaced from the light-emitting surface a distance sufficient to create an elongated light intensity pattern with a major axis along the length of the rod and a minor axis that has a width that covers substantially the entire circumferential width of the light-emitting surface. In a preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the essential features of the illumination device described and claimed in U.S. Pat. No. 6,592,238 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is a structural member that functions both as an optical waveguide and light scattering member. As a waveguide, it tends to preferentially direct light entering the waveguide, including the light entering a lateral surface thereof, along the axial direction of the waveguide, while as a light scattering member, it urges the light out of an opposite lateral surface of the waveguide. As a result, what is visually perceived is an elongated light pattern being emitted along the light-emitting lateral surface of the waveguide.

Nevertheless, a problem with illumination devices using leaky waveguides and LEDs, as described and claimed in U.S. Pat. No. 6,592,238, is that the available visible color spectrum is limited by the finite availability of LED colors.

Therefore, in commonly assigned U.S. Pat. No. 7,011,421, which has been incorporated in its entirety by reference, an illumination device is described that uses fluorescent dyes, thus allowing for emission of light in colors that cannot ordinarily be achieved by use of LEDs alone without significant increase in cost or complexity of the illumination device.

Further, in commonly assigned and co-pending U.S. patent application Ser. No. 11/025,019, which has also been incorporated in its entirety by reference, an illumination device is described that uses phosphorescent dyes, thus allowing for emission of light in colors that cannot ordinarily be achieved by use of LEDs alone without significant increase in cost or complexity of the illumination device.

It is a paramount object of the present invention to provide an illumination device similar to that described in U.S. Pat. No. 6,592,238; U.S. Pat. No. 7,011,421; and U.S. patent application Ser. No. 11/025,019 using color-changing pigment and a novel structural configuration to simulate neon or similar lighting in colors that cannot ordinarily be achieved through the use of LEDs alone without significant increase in cost or complexity.

This object and other objects and advantages of the present invention will become readily apparent and addressed through a reading of the discussion below and a review of the appended drawings.

BRIEF SUMMARY OF THE INVENTION

The present invention meets this object and others and provides an illumination device for simulating neon lighting, and a method of operating such an illumination device.

According to one aspect of the invention, an illumination device has a light source, a waveguide, and a light-transmitting medium. The light source emits light of a first color. The waveguide has both optical waveguide and light scattering properties. The light-transmitting medium is composed of a matrix of substantially translucent material doped with a pigment, and is positioned between the light source and the waveguide such that a portion of the light emitted by the light source passes around the light-transmitting medium and reaches the waveguide directly, and a portion of the light emitted by the light source is received by the light-transmitting medium. The pigment changes a portion of the received light of the first color to a light of a second color, and the light-transmitting medium emits the light of the second color. The waveguide receives the light of the first color and the light of the second color, mixes the light via its optical waveguide and light scattering properties to create a light of a combined color, and emits the light of the combined color.

According to another aspect of the invention, an illumination device for simulating neon lighting has a housing, a string of LEDs, a waveguide, and a light-transmitting medium. The housing has a pair of side walls defining a channel. The string of LEDs is contained within the channel defined by the housing and emits light of a first color. The waveguide has both optical waveguide and light scattering properties, and is positioned along the channel. The light-transmitting medium is composed of a matrix of substantially translucent material doped with a pigment. The light-transmitting medium is positioned between the string of LEDs and the waveguide such that a portion of the light emitted by the string of LEDs passes around the light-transmitting medium and reaches said waveguide directly, and such that a portion of the light emitted by said LEDs is received by said light-transmitting medium. The pigment of the light-transmitting medium changes at least some of the received light to a light of a second color. The light-transmitting medium emits the light of the second color. The waveguide receives the light of the first color and the light of the second color, mixes the light via the light scattering and optical waveguide properties to create a light of a combined color that is a combination of the first color and the second color, and emits the light of the combined color.

According to yet another aspect of the invention, a method for operating an illumination device as described above and including a photoluminescent pigment includes the steps of increasing the intensity of the light source, maintaining the intensity of the light source, and reducing the intensity of the light source. When the intensity of the light source is first increased, the light source emits light of a first color. A portion of the light passes around the light-transmitting medium and reaches the waveguide directly, and a portion of the light is received by the light-transmitting medium. At lease some of the received light is absorbed by and charges the photoluminescent pigment of the light-transmitting medium. The waveguide receives the light of the first color and emits a light substantially of the first color. By maintaining the intensity light source, a portion of the light continues to pass around the light-transmitting medium and reach the waveguide directly, and the photoluminescent pigment converts the absorbed light to a light of a second color. The waveguide receives the light of the first color and the light of the second color, mixes the light via the light scattering and optical waveguide properties to create a light of a color that is a combination of the first color and the second color, and emits the light of the combined color. When the intensity of the light source is reduced, the photoluminescent pigment continues to emit the light of the second color. The waveguide receives the light of the second color and emits a light substantially of the second color.

BRIEF DESCRIPTION OF THE DRAWINGS

FIGS. 10a-10c are sectional views of another exemplary illumination device according to the invention, illustrating various states of operation.

FIG. 11 is a sectional view of yet another exemplary illumination device according to the invention.

DETAILED DESCRIPTION OF EXEMPLARY EMBODIMENTS

Figure 1:
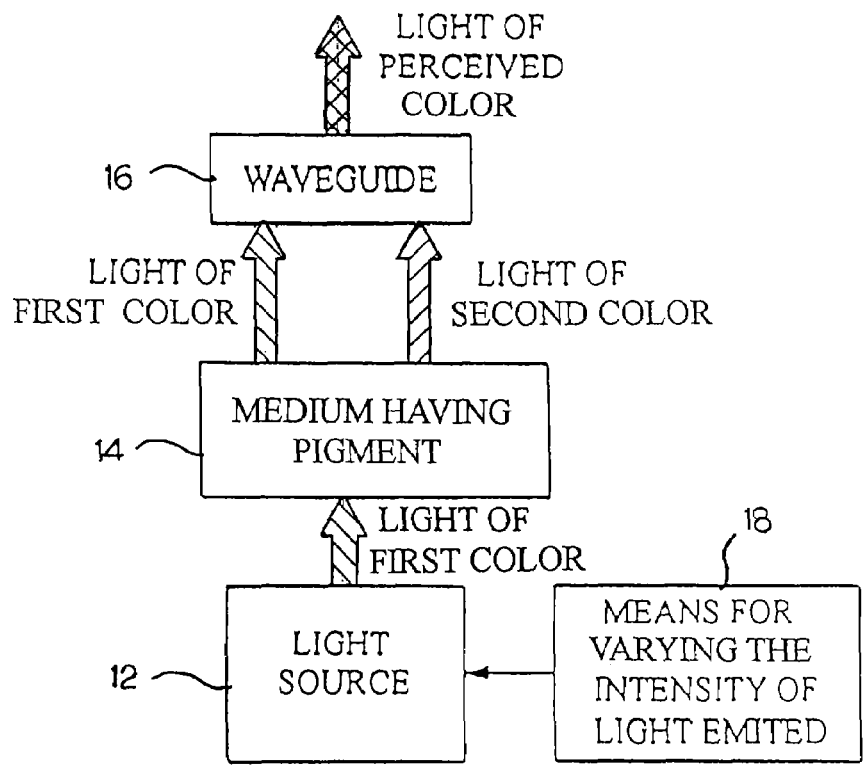
FIG. 1 is a block diagram of an exemplary illumination device according to the invention.

FIG. 1 is a block diagram of an exemplary illumination device according to the invention. The exemplary illumination device has a light source 12, a light-transmitting medium 14, a waveguide 16, and a means 18 for varying the intensity of the light emitted by light source 12.

The light source 12 is for emitting light of a first color. Light color, as used herein, is primarily described in terms of the qualities and characteristics of light perceived by an observer. Those of skill in the art recognize various systems for characterizing colors including "hue, brightness and saturation," "dominant wavelength, luminance, and purity" and others, which, for the purposes herein, are all considered equivalent means for characterizing color. Although it is contemplated that various types of light sources could be utilized to emit the light of the first color, the preferred light source 12 is a plurality of light-emitting diodes (LEDs). Preferably, the LEDs are arranged in a series to form an elongated pattern for the simulation of neon lighting; however, alternate configurations are certainly within the spirit and scope of the claimed invention.

Figure 2:
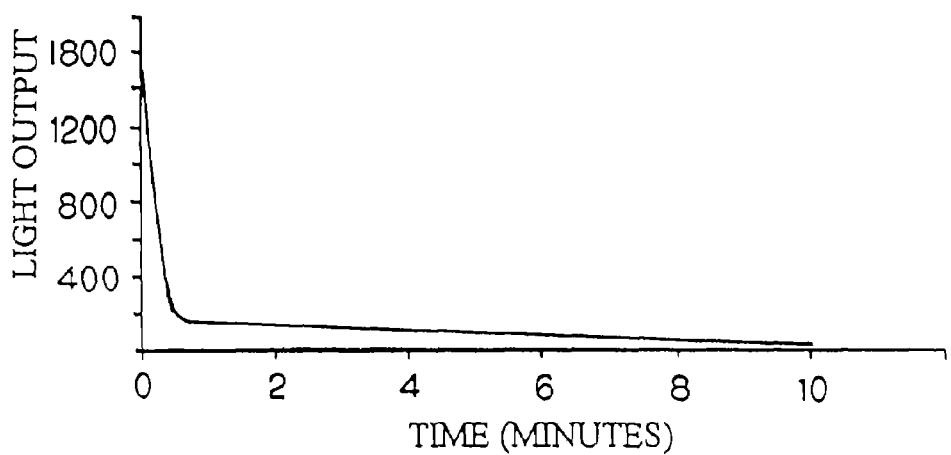
FIG. 2 is a chart of phosphorescent light decay versus time for an exemplary phosphorescent dye.

The light-transmitting medium 14 has a density of a pigment for changing the color of the light emitted by the light source 12. A pigment is a substance used as coloring, and may be found in dyes, paints, or other substances that impart color. Pigments for changing the color of the light emitted by the light source 12 may have photoluminescent properties, such as phosphorescent and fluorescent dyes, or non-photoluminescent properties. Pigments with photoluminescent properties absorb light having a higher energy color, and then emit light having a different, lower energy color. Phosphorescent dyes absorb and emit light at a slower rate that fluorescent dyes. FIG. 2 is a chart of phosphorescent light decay versus time for an exemplary phosphorescent dye. Many phosphorescent dyes will continue to emit light for a long period of time, ranging from seconds to hours, after the light having a higher energy color is removed. Non-photoluminescent pigments change the color of the light passing through the pigments by acting as a filter of the non-passed colors.

The light-transmitting medium 14 is positioned adjacent the light source 12 for receiving light emitted from the light source 12. Thus, the pigment of the light-transmitting medium 14 will change the color of the light into a second color. As shown in the embodiment of FIG. 1, if a density of pigment is selected such that a portion of the light from the light source 12 is transmitted or "leaks" through the light-transmitting medium 14 without being changed by the pigment, the perceived light will be of a color that is a combination of the first color and the second color. However, if the density of pigment is selected such that all of the light from the light source 12 is changed by the pigment, the perceived light will be of the second color only. In either case, the perceived light will be different color than the predetermined first color of the light source 12.

The waveguide 16 is positioned adjacent the light-transmitting medium 14 for receiving light of the first color and light of the second color. The waveguide 16 has both optical waveguide and light scattering properties, in order to mix the various light components into homogeneity and to provide a uniform light intensity pattern along the waveguide.

Figure 3:
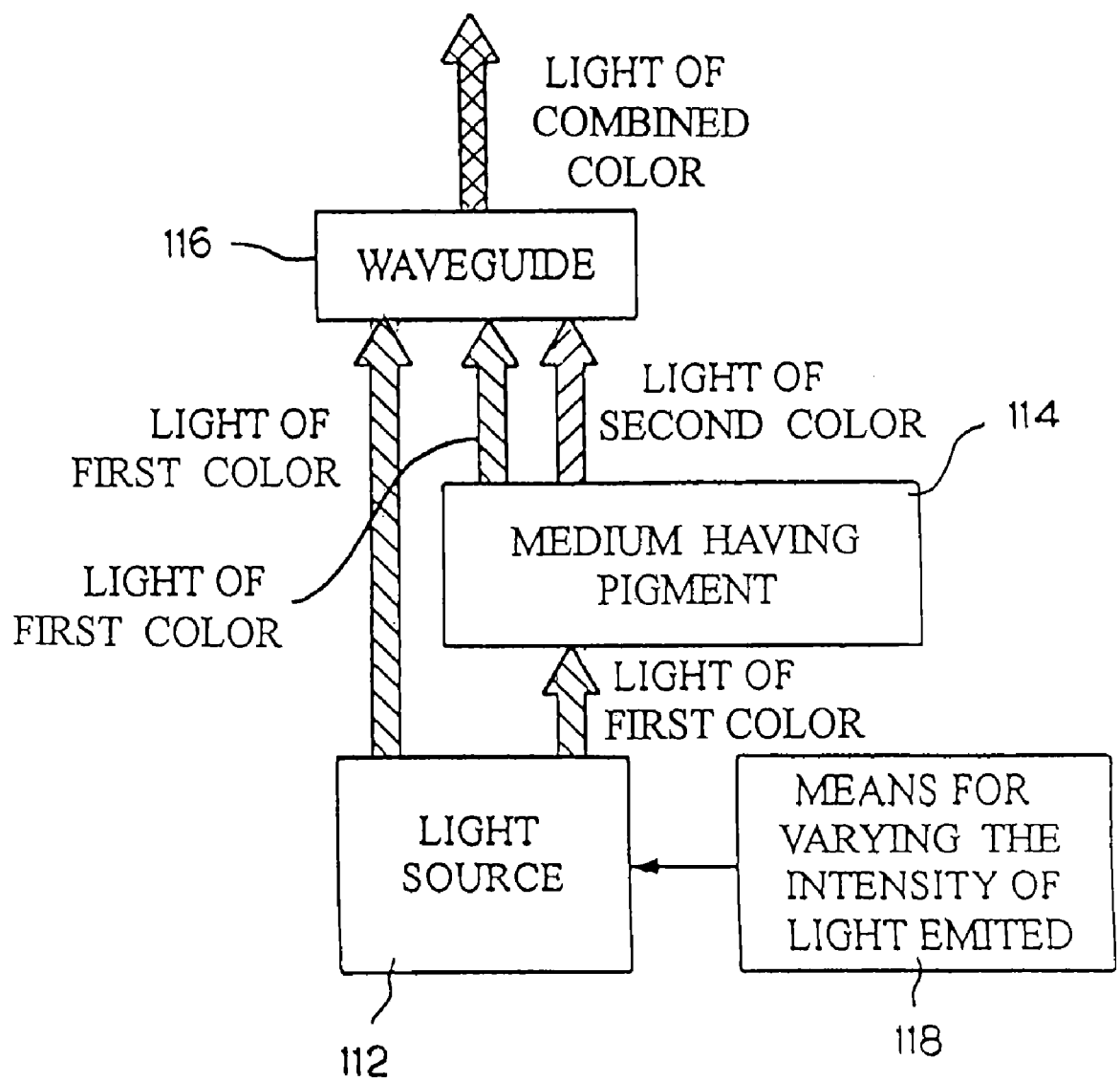
FIG. 3 is a block diagram of another exemplary illumination device according to the invention.

FIG. 3 shows another exemplary illumination device having an alternate cooperation between the light source 112, the light-transmitting medium 114, and the waveguide 116. In this configuration, a portion of the light emitted by the light source 112 passes around the light-transmitting medium 114 and reaches the waveguide 116 directly, without passing through the light-transmitting medium 114, while another portion of the light emitted by the light source 112 is received by the light-transmitting medium 114. The pigment of the light-transmitting medium changes at least some of the light received to a light of a second color, which is then emitted by the light-transmitting medium 114. The waveguide 116 receives the light of the first color and the light of the second color, and mixes the light via the light scattering and optical waveguide properties of the waveguide 116. The waveguide 116 emits the mixed light, which is of a color that is a combination of the first color and the second color.

Advantageously, the embodiment of FIG. 3 may have a waveguide 116 comprising a profiled rod having a lateral light-receiving surface and a lateral light-emitting surface, as described in U.S. Pat. No. 6,592,238. The light source 112 may then extend along and be positioned adjacent the light-receiving surface and the light-transmitting medium 114, and spaced a sufficient distance from the light-emitting surface to create an elongated light intensity pattern with a major axis along the length of the waveguide 116 and a minor axis that has a width that covers substantially the entire circumferential width of the light-emitting surface. In a preferred arrangement, the light source 112 is a string of point light sources, such as LEDs, spaced a distance apart sufficient to permit the mapping of the light emitted by each point light source into the light-transmitting medium 114 and the waveguide 116 so as to create elongated and overlapping light intensity patterns along the light-emitting surface and circumferentially about the surface so that the collective light intensity pattern is perceived as being uniform over the entire light-emitting surface.

Figure 4:
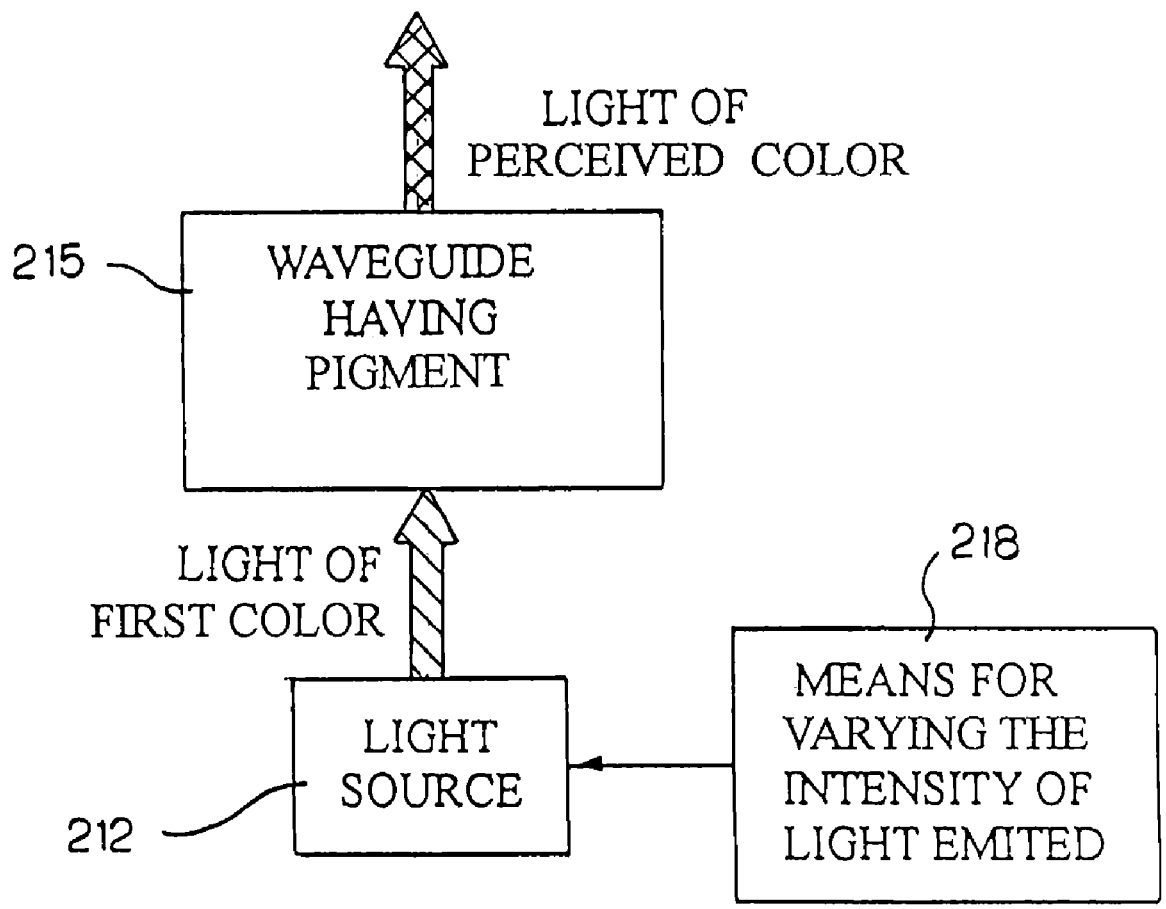
FIG. 4 is a block diagram of yet another exemplary illumination device according to the invention

FIG. 4 shows yet another exemplary illumination device, wherein the light-transmitting medium having a pigment and the waveguide are combined. Thus, the exemplary illumination device of FIG. 4 has a waveguide 215 that has a predetermined density of a pigment. The waveguide 215 has both optical waveguide and light scattering properties, and is positioned adjacent the light source 212 for receiving light of the first color. The density of pigment in the waveguide 215 can be selected such that the pigment will change only a portion of light of the first color into light of a second color. Thus, a portion of the light of the first color will not be changed by the pigment, resulting in a perceived color that is a combination of light of the first color and light of the second color. Alternatively, the density of pigment in the waveguide 215 can be selected such that the pigment will change all of the light of the first color. Thus, the perceived color will contain only light of the second color changed by the pigment. In either case, the characteristics of the waveguide 215 will provide a uniform light intensity pattern along the waveguide 215.

Any of the exemplary illumination device configurations described herein could utilize multiple pigments or combinations of pigments. This description is intended to cover all combinations and permutations of pigments.

Referring to the exemplary illumination device configurations shown in FIGS. 1, 3 and 4, the means 18, 118, 218 for varying the intensity of the light emitted by the light source 12, 112, 212 will create various effects of the perceived color varying with the state of the light emitted by the light source when using a photoluminescent pigment, and particularly when using a phosphorescent pigment. For instance, when the light source 12, 112, 212 is on in a continuous state, the perceived color will be a fixed combination of the first color and the second color. When the light source 12, 112, 212 is then removed or switched off, the photoluminescent pigment will continue to emit light in the second color only. This characteristic could serve as a useful safety feature in the event of a power failure, where a phosphorescent pigment would continue to emit light for minutes after the light source is removed or switched off. Further, this characteristic can be utilized to produce a two-color system by pulsing the light such that the perceived color alternates between the composite color and the second color alone. Still further effects can be achieved by controlling the waveform of the power signal to the light source. For instance, a power signal in the shape of a sine wave having a period similar to the decay time of the photoluminescent pigment will cause the intensity of the light source 12, 112, 212 to vary corresponding to the power signal. The light emitted by the photoluminescent pigment will also vary in response to the varying intensity of the light source 12, 112, 212. Therefore, the perceived color of the light emitted by the illumination device will vary with the varying intensities of the light emitted by the light source 12, 112, 212 and the light emitted by the photoluminescent pigment.

Means 18, 118, 218 for varying the intensity of the light emitted by the light source 12, 112, 212 are know in the art, and include: switching power supplies; function or waveform generators; rheostats or dimmer-switches; and simple on-off switches. Such means 18 are preferably capable of generating pulses or other power signal waveforms, including square waves and sine waves. Also, such means 18, 118, 218 are most likely capable of controlling the characteristics, such as the shape, duty cycle, amplitude and frequency of the power signal waveform.

Figure 5:
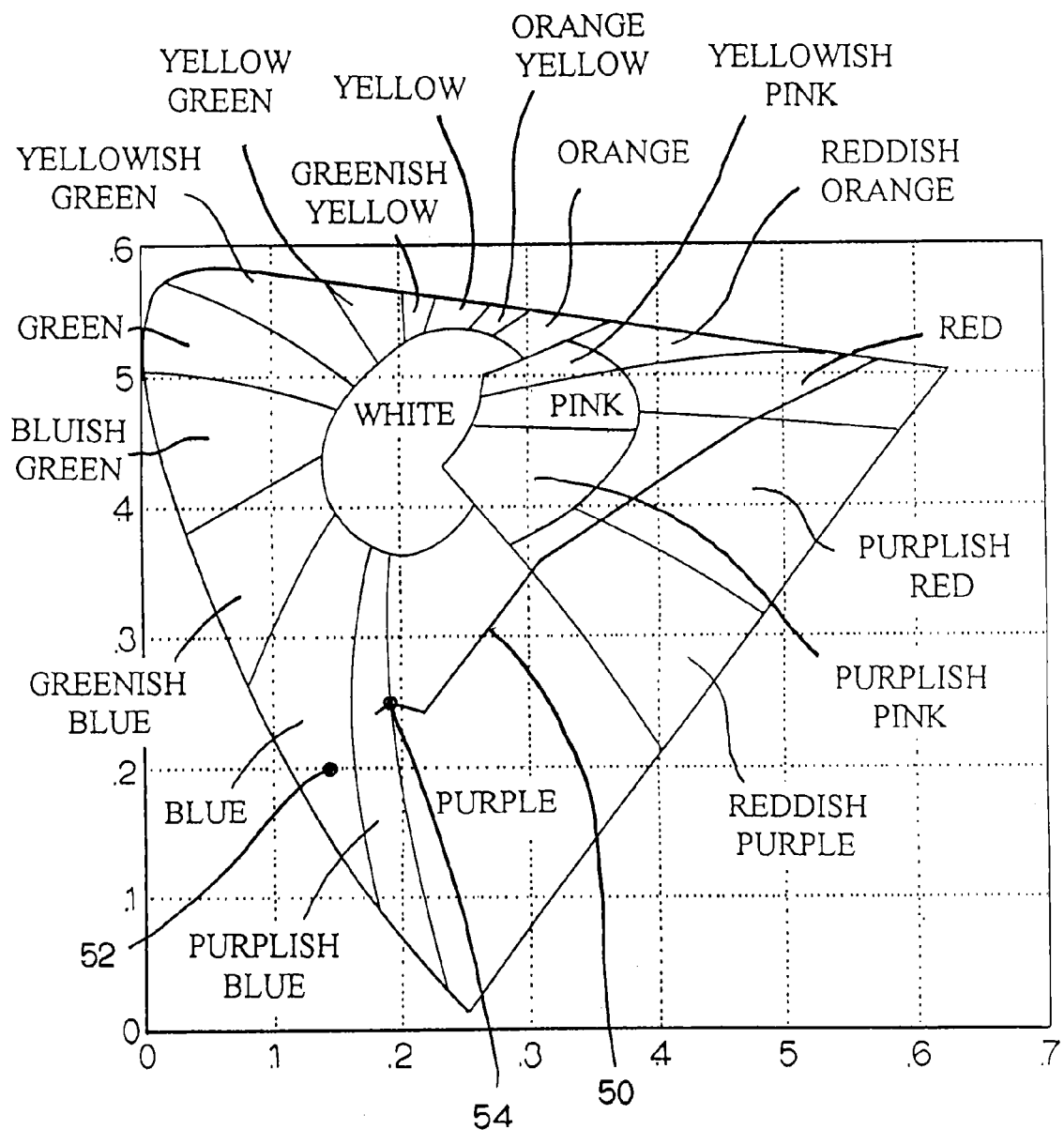
FIG. 5 is a CIE diagram tracing the color of the light emitted by an exemplary illumination device according to the invention.

For example, FIG. 5 shows a CIE diagram where a line 50 traces the perceived color of the light emitted by an exemplary illumination device according to the invention using blue LEDs and a red phosphorescent dye. A power signal in the shape of a sine wave drives the LEDs. The period of sine wave and the decay time of the phosphorescent dye should be similar to create the color-changing effect observed. The blue LEDs emit light of a first color, represented by a first point 52. Also, a second point 54 represents the perceived color when the LEDs are operated at a constant, full-output (or DC) state. Thus, the perceived color line 50 indicates a perceived color that begins as purplish blue, transitions into a series of other purplish colors, and then becomes red.

Figure 6:
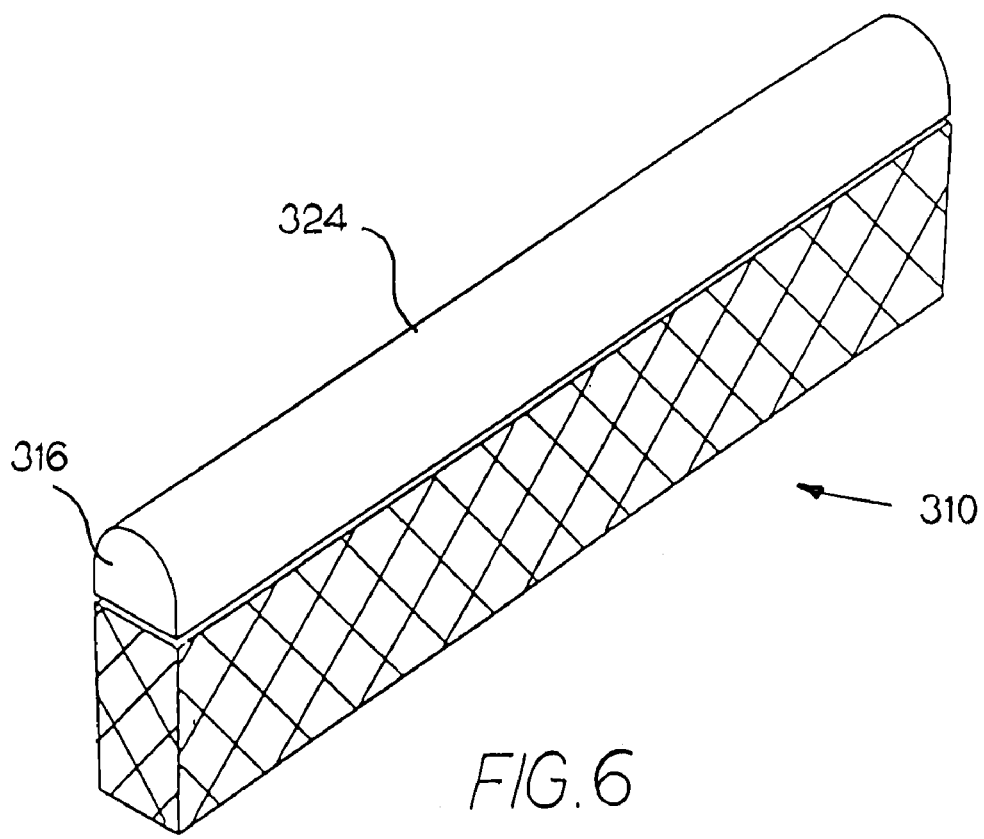
FIG. 6 is a perspective view of an exemplary illumination device according to the invention.
Figure 7:
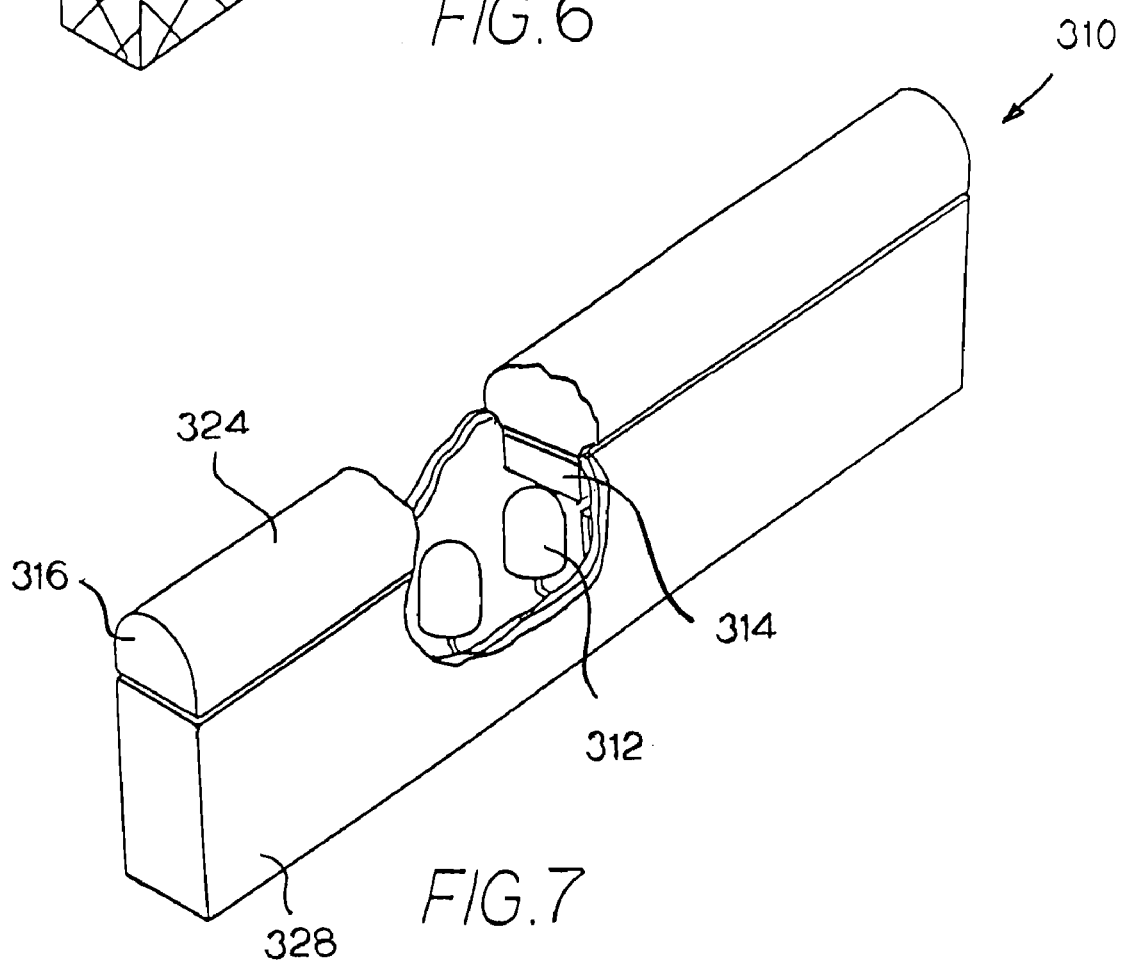
FIG. 7 is perspective view with selected portions cutaway of the exemplary illumination device of FIG. 6.
Figure 8:
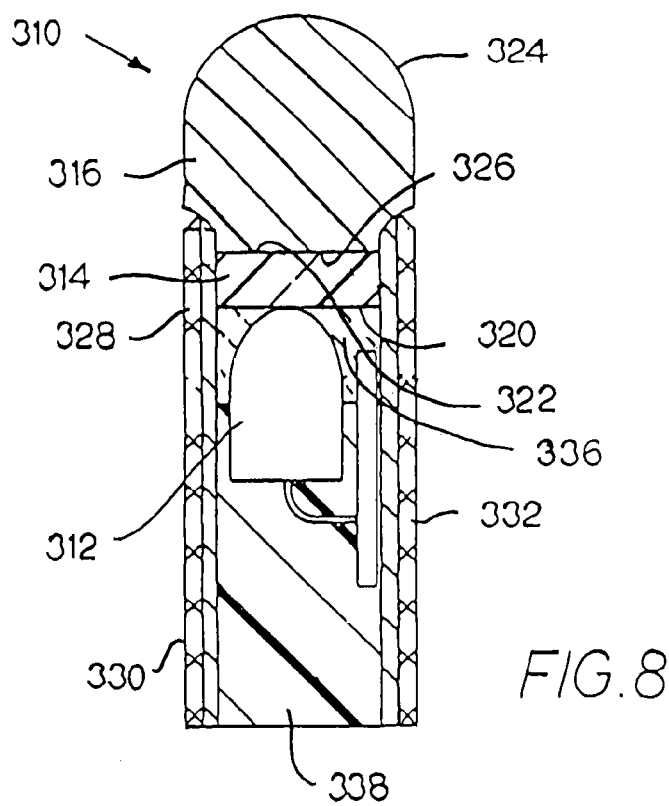
FIG. 8 is a sectional view of an exemplary illumination device according to the invention, similar to the illumination device of FIG. 6.

FIGS. 6-8 show an embodiment of an exemplary illumination device 310 according to the invention. The exemplary illumination device 310 is generally comprised of a light source 312, a light-transmitting medium 314, and a waveguide 316. A means for varying the intensity of the light emitted by the light source, as described above, would be operatively connected to the illumination device 310, but for convenience is not shown.

As mentioned above, the preferred light source 312 is a plurality of light-emitting diodes (LEDs) having a first color. More specifically now, the LEDs utilized in the exemplary embodiment discussed herein are high-intensity, blue-colored LEDs having a wavelength of approximately 465-470 nm. Blue is a higher energy color in the spectrum, and the availability of high-intensity, high-output LEDs in this color makes them preferable for exciting phosphorescent dyes for emitting a range of lower-energy colors, and, therefore, producing a range of perceived colors. As shown, the LEDs can be arranged in an elongated pattern to form a string or strings of lights to facilitate the simulation of a neon tube. For example, the LEDs can be mounted on a circuit board in a substantially linear array or series, as shown.

The light-transmitting medium 314 of the exemplary illumination device 310 is an intermediate member extending along and positioned adjacent the light source 312. The light-transmitting medium 314, as shown, has a light-receiving surface 320 for receiving light emitted from said light source 312 and a light-emitting surface 322 for emitting light into the waveguide 316. Thus, the light-transmitting medium 314 is, in effect, a color conversion system where the phosphorescent dye absorbs light of a first color emitted by said light source 312, and emits light of a second, lower-energy color. By selecting a density of phosphorescent dye that will allow a portion of the light from the light source 312 to be transmitted or "leak" through the light-transmitting medium 314 without being absorbed by the dye, light observed along the light-emitting surface 322 of the light color conversion system will be perceived as having a color different that the light of the first predetermined color.

The light-transmitting medium 314 is preferably composed of a matrix of a substantially translucent acrylic, polyurethane, or similar material doped or tinted with a predetermined density of the phosphorescent dye. A preferred polyurethane for this application is a polyurethane manufactured and distributed by IPN Industries, Inc. of Haverhill, Mass. under trade name EGA-202. An exemplary dye is CP2-35 Fire Red Acrylic Lacquer glow-in-the-dark paint, manufactured and distributed by Risk Reactor of Huntington Beach, Calif. However, alternate configurations of the light-transmitting medium 314 and other dyes or combinations of dyes are possible and covered under both the spirit and the scope of the claimed invention.

Further, the phosphorescent dye of the light-transmitting medium 314 will continue to emit some amount of the lower-energy light even after the light source 312 stops emitting. Thus, if there is a power failure, the illumination device 310 will continue to provide some illumination from the phosphorescent dye of the intermediate light-transmitting medium 314, which is a useful safety feature.

The waveguide 316 is a substantially rod-like member that preferably has an external curved surface 324 serving as a light-emitting surface and an interior surface 326 that serves as a light-receiving surface. Light entering the waveguide 316 from the light-transmitting medium 314 positioned below the light-receiving surface 324 is scattered within the waveguide 316 so as to exit with a diffused distribution out of the external curved surface 324. The external curved surface 324 aids in simulating the appearance of a neon tube.

A housing 328 preferably comprises a pair of side walls 330, 332 that define an open-ended channel that extends substantially the length of waveguide 316. The housing 328 generally functions to house the light source 312 and associated electrical accessories (e.g., a circuit board). Further, the side walls 330, 332 may have internal surfaces having collection surfaces for collecting and reflecting light into said light-transmitting medium 314. In the exemplary embodiment best shown in FIG. 8, the channel defined by the housing 328 is partially filled with a white potting compound 338 below the light source 312 to reflect light upwardly toward the waveguide 316. A portion of the volume of the open-ended channel is also filled with a translucent potting compound 336 that partially encapsulates the light source 312 and maintains the position of the light source 312 relative to the housing 328. When such a translucent potting compound 336 is incorporated into an illumination device 310 constructed in accordance with the present invention, the potting compound 336 should have an index of refraction essentially matching the index of refraction of the light source 312 to minimize Fresnel losses at the interface.

Figure 9:
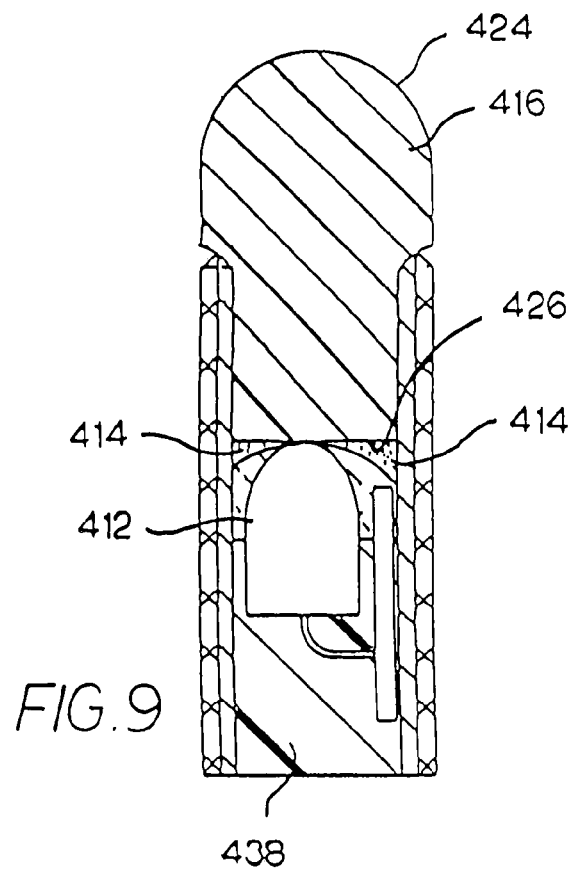
FIG. 9 is a sectional view of another exemplary illumination device according to the invention.

In an another exemplary illumination device shown in FIG. 9, a coating 414 containing a pigment is applied to the internal surface 426 of the waveguide 416. In another similar, but not shown, embodiment a coating containing a pigment could be applied to the external curved surface 424 of the waveguide 416. In yet another similar, but not shown, embodiment, the waveguide 416 itself could be doped with a pigment. In all of the described embodiments, light emitted by the device will be perceived as having a color different than the light of the first color of the light source 412.

FIGS. 10a-10c show another exemplary illumination device having a light source 512, a light-transmitting medium 514 and a waveguide 516, where a portion of the light emitted by the light source 512 passes around the light-transmitting medium 514 and reaches the waveguide 516 directly.

FIG. 10a shows an initial state where the light source 512 is first turned on or the intensity of the light source 512 is first increased. A portion of the light emitted by the light source 512 passes around the light-transmitting medium 514 and reaches the waveguide 516 directly, and a portion of the light emitted by the light source 512 is received by the light-transmitting medium 514. At least some of the light received by the light-transmitting medium 514 is absorbed by the photoluminescent pigment. The waveguide receives the light of the first color, and emits light substantially of the first color.

FIG. 10*b* shows a state where the intensity of the light source 512 is maintained. The photoluminescent pigment in the light-transmitting medium 514 converts the absorbed light into a light of a second color. The light-transmitting medium 514 emits the light of a second color. The waveguide 516 receives the light of the first color and the light of the second color, mixes the light to create a light of a color that is a combination of the first color and the second color, and emits the light of the combined color.

FIG. 10*c* shows a state where the intensity of the light source 512 has been reduced or turned off. The photoluminescent pigment continues to emit or "discharge" the light of the second color. The waveguide 516 receives the light of the second color, and emits light that is substantially of the second color. Thus, by varying the intensity of the light emitted by the light source 512 and timing it with the charging and discharging of the photoluminescent pigment, the light emitted by the device will have a varying color.

FIG. 11 shows yet another exemplary illumination device having a light source 612, a light transmitting medium 614 and a waveguide 616, where the light-transmitting medium 614 has a first region 640 that is substantially transparent, a second region 642 that is doped with a predetermined density of a first pigment, and a third region 644 that is doped with a predetermined density of a second pigment.

Several effects can be achieved with this configuration. First, doping the second region 642 with a long-lived (i.e., slow emitting) red emitting phosphorescent pigment and doping the third region 644 with a shorter-lived (i.e., more quickly emitting) red emitting phosphorescent pigment will enhance the red characteristic of the perceived light and stretch it out. Second, doping the second region 642 with a red emitting phosphorescent pigment, doping the third region 644 with a green or yellow emitting phosphorescent pigment, and using blue LEDs will, in effect, create a red, green, blue, or a red, yellow, blue system allowing a larger range of perceived colors, including white.

It will be obvious to those skilled in the art that other modifications may be made to the embodiments as described herein without departing from the spirit and scope of the present invention.

What is claimed is:

1. An illumination device comprising:
   a light source emitting light of a first color;
   a waveguide having both optical waveguide and light scattering properties; and
   a light-transmitting medium composed of a matrix of substantially translucent material doped with a pigment, said light-transmitting medium positioned between said light source and said waveguide such that a portion of said light emitted by said light source passes around said light-transmitting medium and reaches said waveguide directly and a portion of said light emitted by said light source is received by said light-transmitting medium, said pigment changing a portion of said light of said first color to a light of a second color, said light-transmitting medium emitting said light of said second color;
   wherein said waveguide receives said light of said first color and said light of said second color, mixes said light via said light scattering and optical waveguide properties to create light of a combined color that is a combination of the first color and the second color, and emits said light of said combined color.

2. The illumination device of claim 1, wherein said waveguide comprises a profiled rod having a light-receiving surface and a light-emitting surface, wherein said light source extends along and is positioned adjacent said light-receiving surface and said light-transmitting transmitting medium, and is spaced a sufficient distance from said light-emitting surface to create an elongated and uniform light intensity pattern along said light-emitting surface.

3. The illumination device of claim 2, wherein said light source is a plurality of point light sources spaced a distance apart sufficient to permit the mapping of the light emitted by each point light source into the light-transmitting medium and the waveguide so as to create elongated and overlapping light intensity patterns along the light-emitting surface so that the light intensity pattern is uniform over the entire light-emitting surface.

4. The illumination device of claim 3, wherein said point light sources are light-emitting diodes (LEDs).

5. The illumination device of claim 4, and further comprising a housing extending substantially the length of said waveguide and containing said LEDs.

6. The illumination device of claim 5, wherein said housing generally comprises a pair of side walls that define a channel.

7. The illumination device of claim 6, wherein said side walls have internal surfaces, said internal surfaces reflecting light into said light-transmitting medium and said waveguide.

8. The illumination device of claim 1, wherein said pigment has non-photoluminescent properties.

9. The illumination device of claim 1, wherein said pigment is a fluorescent dye.

10. The illumination device of claim 1, wherein said pigment is a phosphorescent dye.

11. The illumination device of claim 10, and further comprising a means for varying the intensity of the light emitted by said light source such that said light of said combined color varies with said varying intensity of said light emitted by said light source.

12. The illumination device of claim 11, wherein said means for varying the intensity of the light emitted by the light source is a control device controlling a waveform of a power signal to said light source, including the shape, duty cycle, amplitude, and frequency of the power signal waveform.

13. The illumination device of claim 12, wherein said waveform of the power signal to said light source is selected from the group consisting of: square wave and sine wave.

14. An illumination device for simulating neon lighting comprising:
   a housing comprising a pair of side walls defining a channel;
   a plurality of LEDs contained within said housing, said plurality of LEDs emitting light of a first color;
   a waveguide having both optical waveguide and light scattering properties, said waveguide positioned along said housing; and
   a light-transmitting medium composed of a matrix of substantially translucent material doped with a pigment, said light-transmitting medium positioned between said plurality of LEDs and said waveguide such that a portion of said light emitted by said plurality of LEDs passes around said light-transmitting medium and reaches said waveguide directly, and a portion of said light emitted by said LEDs is received by said light-transmitting medium, said pigment changing a portion of said received light to a light of a second color, said light-transmitting medium emitting said light of said second color;

wherein said waveguide receives said light of said first color and said light of said second color, mixes said light via said light scattering and optical waveguide properties to create light of a combined color that is a combination of said first color and said second color, and emits said light of said combined color.

15. The illumination device of claim 14, wherein said waveguide comprises a profiled rod having a light-receiving surface and a light-emitting surface, wherein said light source extends along and is positioned adjacent said light-receiving surface and said light-transmitting medium, and is spaced a sufficient distance from said light-emitting surface to create an elongated and uniform light intensity pattern along said light-emitting surface.

16. The illumination device of claim 15, wherein individual LEDs of said plurality of LEDs are spaced a distance apart sufficient to permit the mapping of the light emitted by each LED into the light-transmitting medium and the waveguide so as to create elongated and overlapping light intensity patterns along the light-emitting surface so that the light intensity pattern is uniform over the entire light-emitting surface.

17. The illumination device of claim 16, wherein said side walls have internal surfaces, said internal surfaces reflecting light into said light-transmitting medium and said waveguide.

18. The illumination device of claim 17, wherein said pigment has non-photoluminescent properties.

19. The illumination device of claim 17, wherein said pigment is a fluorescent dye.

20. The illumination device of claim 17, wherein said pigment is a phosphorescent dye.

21. The illumination device of claim 20, and further comprising a means for varying the intensity of the light emitted by said plurality of LEDs such that said light of said combined color varies with said varying intensity of said light source.

22. The illumination device of claim 21, wherein said means for varying the intensity of the light emitted by the light source is a control device controlling a waveform of a power signal to said light source, including the shape, duty cycle, amplitude, and frequency of the power signal waveform.

23. A method of operating an illumination device having a light source for emitting light of a first color, a waveguide having both optical waveguide and light scattering properties, and a light-transmitting medium composed of a matrix of substantially translucent material doped with a photoluminescent pigment, said light-transmitting medium positioned between said light source and said waveguide such that a portion of any light emitted by said light source will pass around said light-transmitting medium and reach said waveguide directly and a portion of any light emitted by said light source will be received by said light-transmitting medium, said method including the steps of:

increasing the intensity of light of said first color emitted by said light source, a portion of said emitted light being received by said light-transmitting medium and absorbed by said photoluminescent pigment, wherein said waveguide receives said light of a first color and emits a light substantially of said first color;

maintaining said intensity of said light source, said photoluminescent pigment converting said absorbed light to a light of a second color, said light-transmitting medium emitting said light of said second color, wherein said waveguide receives said light of said first color and said light of said second color, mixes said light via said light scattering and optical waveguide properties to create light of a combined color that is a combination of said light of said first color and said light of said second color, and emits said light of said combined color; and reducing said intensity of said light source, said photoluminescent pigment continuing to emit said light of said second color, wherein said waveguide receives said light of said second color and emits light substantially of said second color.

24. The method of claim 23, further comprising:

varying said intensity of said light emitted by said light source, such that said waveguide emits light having a color that varies with said varying intensity of said light emitted by said light source.

* * * * *